(12) United States Patent
Hirao

(10) Patent No.: US 10,057,443 B2
(45) Date of Patent: Aug. 21, 2018

(54) IMAGE PROCESSING APPARATUS FOR READING AND PRINTING A DOCUMENT IMAGE, CONTROL METHOD FOR THE IMAGE PROCESSING APPARATUS, AND STORAGE MEDIUM

(71) Applicant: CANON KABUSHIKI KAISHA, Tokyo (JP)

(72) Inventor: Toyomi Hirao, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/972,764

(22) Filed: Dec. 17, 2015

(65) Prior Publication Data

US 2016/0191737 A1 Jun. 30, 2016

(30) Foreign Application Priority Data

Dec. 25, 2014 (JP) ................................. 2014-262922

(51) Int. Cl.
*H04N 1/00* (2006.01)
*G03G 15/00* (2006.01)

(52) U.S. Cl.
CPC ..... *H04N 1/00801* (2013.01); *H04N 1/00037* (2013.01); *H04N 1/00084* (2013.01); *H04N 1/00811* (2013.01); *G03G 15/50* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,873,427 | B1 * | 3/2005 | Matsuda | H04N 1/00931 358/1.1 |
| 2005/0238205 | A1 * | 10/2005 | Kimura | G06K 9/03 382/112 |
| 2014/0036289 | A1 * | 2/2014 | Muroi | H04N 1/21 358/1.13 |

FOREIGN PATENT DOCUMENTS

JP 2001-69318 A 3/2001

* cited by examiner

*Primary Examiner* — Andrew H Lam
(74) *Attorney, Agent, or Firm* — Canon U.S.A., Inc. IP Division

(57) ABSTRACT

In one embodiment, a control method for an image processing apparatus including a reading unit configured to read a document image and a printing unit configured to print the document image read by the reading unit is provided. The control method includes detecting an error in process of reading by the reading unit, causing the reading unit to perform reread processing for rereading the document image based on the error being detected, and refraining, in a case where the image processing apparatus operates in a mode in which the printing unit starts printing without waiting for the reading unit to complete reading a document image, from causing the reading unit to perform the reread processing based on the error being detected.

8 Claims, 12 Drawing Sheets

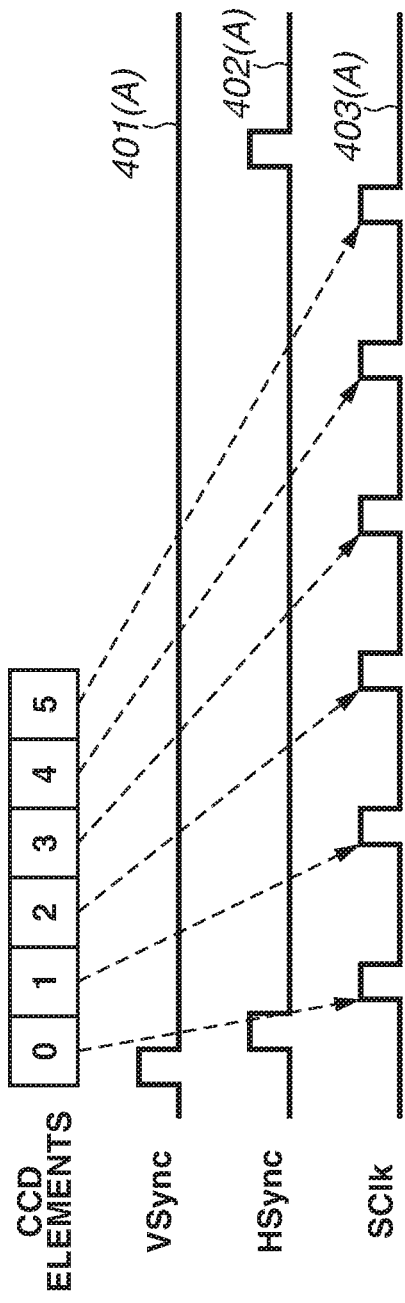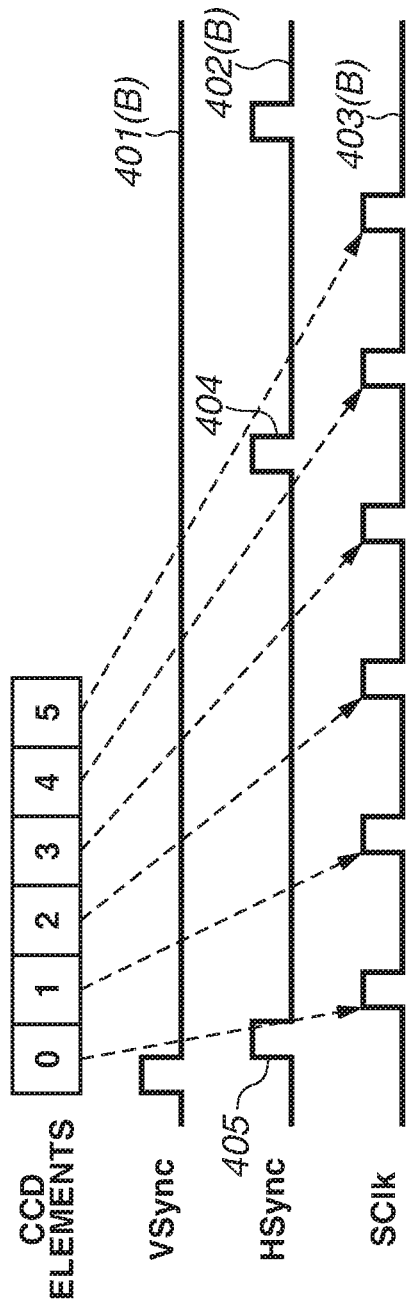

| JOB INFORMATION | |
|---|---|
| JOB TYPE | COPY |
| MODE | FCOT |
| NUMBER OF COPIES | 1 |
| COLOR MODE | MONOCHROME |
| ... | ... |

| JOB INFORMATION | |
|---|---|
| JOB TYPE | FACSIMILE TRANSMISSION |
| MODE | DIRECT TRANSMISSION MODE |
| TRANSMISSION DESTINATION | XXX-XXXX-XXXX |
| ... | ... |

901(B)

IMAGE PROCESSING APPARATUS FOR READING AND PRINTING A DOCUMENT IMAGE, CONTROL METHOD FOR THE IMAGE PROCESSING APPARATUS, AND STORAGE MEDIUM

BACKGROUND OF THE INVENTION

Field of the Invention

Aspects of the present invention generally relate to an image processing apparatus, a control method for an image processing apparatus, and a storage medium.

Description of the Related Art

Some image processing apparatuses, such as image forming apparatuses, are equipped with a general technique of, when an abnormality has occurred during reading of a document image, suspending a reading operation, performing error processing, and then re-performing the reading operation. The abnormality, which may occur during reading, includes, for example, an abnormality that requires users to remove a document, such as a paper jam occurring during conveyance of a document, and an abnormality of an image transfer signal caused by noises or other factors.

In particular, in the case of an abnormality of an image transfer signal, merely re-performing reading may often resolve an error. Therefore, with regard to processing for re-performing reading when an abnormality of an image transfer signal is detected, it is desirable that processing for rereading be automatically performed without waiting for the reception of a reading re-performing instruction from the user. Such a rereading function is currently available for some image forming apparatuses.

Moreover, there is known a technique of performing reading image processing and printing image processing in parallel when printing and outputting a read document image (hereinafter referred to as "FCOT mode").

Here, "FCOT" refers to a time required until a sheet on which image data generated by reading the first page of a document has been printed is output (First Copy Out Time).

A method for implementing the FCOT mode is discussed in Japanese Patent Application Laid-Open No. 2001-69318. There are also known image forming apparatuses equipped with a sequential transmission mode of performing document reading and transmission in parallel when performing facsimile transmission (hereinafter referred to as "direct transmission mode").

In the case of the FCOT mode, in which reading image processing and printing image processing or read processing and output processing, such as read processing and facsimile transmission processing, are performed in parallel, when an abnormality has occurred during read processing, output processing also needs to be simultaneously suspended. In particular, in the case of facsimile transmission processing, when an abnormality has occurred during read processing, a communication line needs to be interrupted. For that purpose, a retry counter is provided to control processing as follows.

For example, in the FCOT mode, in a case where image data has been partially transferred to the printer side, since retry may make the image data abnormal, it is undesirable to perform retry, so that the retry counter is set to 0. On the other hand, in other processing operations, it may be desirable to perform retry, so that the retry counter is set to a variable equal to or greater than 1.

Furthermore, on the other hand, a power failure may occur depending on electrical power conditions in Japan or foreign countries, such as India. Therefore, it may be desirable to set the threshold value of the retry counter to a variable specific for each destination.

The following are issues arising in a case where a factor causing the requirement of recovery processing attributes to an abnormality of signal processing.

The above-mentioned image processing apparatus detects an abnormality of signal processing (signal abnormality), the occurrence frequency of which is not so high unlike the occurrence of a paper jam, and automatically recovers read processing. Then, since the communication line has already been interrupted, an unnecessary reading operation may be performed. In addition, in a case where there is an abnormality in a data path for transferring signals, even if the image processing apparatus automatically performs reading recovery processing, a signal abnormality may occur again. Therefore, unless interruption processing is performed by the user, recovery processing may be performed unlimitedly.

Moreover, the occurrence frequency of signal abnormality varies with the electrical power conditions of operation locations of image forming apparatuses. Therefore, in the case of the above-mentioned configuration in which the limit of the number of times of recovery processing caused by signal abnormality is fixed, it is impossible to implement recovery processing adapted to each destination in which image forming apparatuses are used.

SUMMARY OF THE INVENTION

According to an aspect of the present invention, an image processing apparatus includes a reading unit configured to read a document image, a printing unit configured to print the document image read by the reading unit, a detection unit configured to detect an error in process of reading by the reading unit, and a control unit configured to cause the reading unit to perform reread processing for rereading the document image based on the error being detected by the detection unit, wherein, in a case where the image processing apparatus operates in a mode in which the printing unit starts printing without waiting for the reading unit to complete reading a document image, the control unit refrains from causing the reading unit to perform the reread processing based on the error being detected by the detection unit.

Further features of the present invention will become apparent from the following description of exemplary embodiments with reference to the attached drawings.

BRIEF DESCRIPTION OF THE DRAWINGS

FIGS. 4A and 4B are timing charts illustrating reading signals output from a contact image sensor (CIS).

FIGS. 9A and 9B illustrate examples of job information about jobs that are able to be performed by the image processing apparatus.

DESCRIPTION OF THE EMBODIMENTS

Various exemplary embodiments, features, and aspects of the invention will be described in detail below with reference to the drawings.

<System Configuration>

Figure 1:
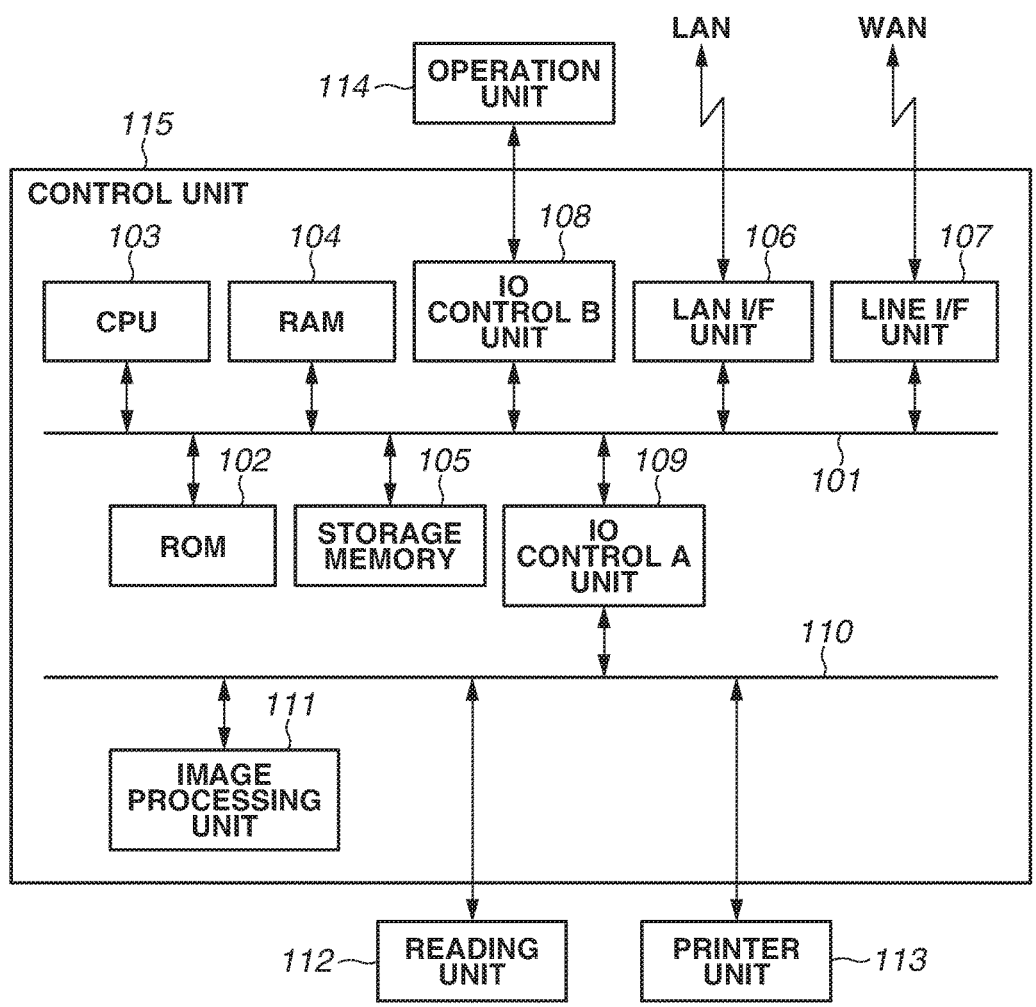
FIG. 1 is a block diagram illustrating a control configuration of an image processing apparatus.

FIG. 1 is a block diagram illustrating a control configuration of an image processing apparatus according to an exemplary embodiment of the present invention. In the present exemplary embodiment, the image processing apparatus is, for example, a multifunction peripheral, which is capable of performing multiple functions.

Referring to FIG. 1, constituent units included in a control unit 115 are connected to a system bus 101 and an image bus 110. A read-only memory (ROM) 102 stores a system boot program. System software, which implements each unit in the present exemplary embodiment, is stored in the ROM 102 or a storage memory 105, and is executed by a central processing unit (CPU) 103.

A random access memory (RAM) 104 is a system work memory used for the CPU 103 to execute software, and is also an image memory used to temporarily store image data for processing. The storage memory 105 is used as an internal storage. The storage memory 105 stores data read by a reading unit 112, image data, and system software. The storage memory 105 is composed of a hard disk drive (HDD) or a solid state drive (SSD). The storage memory 105 is partitioned into a plurality of sections, each of which is capable of storing a read document image.

In the present exemplary embodiment, each region of the storage memory 105 used to store an image is referred to as a "box". A local area network (LAN) interface (I/F) unit 106 is used to connect to a LAN and performs input and output of information with various devices connected to the LAN. The ROM 102, the CPU 103, the RAM 104, the storage memory 105, the LAN I/F unit 106, a line I/F unit 107, an input-output (IO) control B unit 108, and an IO control A unit 109 are connected to the system bus 101. The IO control A unit 109 connects the system bus 101 to the image bus 110, which is used to transfer image data at high speed. The IO control A unit 109 serves as a bus bridge for converting a data structure for the system bus 101. The image bus 110 is composed of a general-purpose bus, such as a Peripheral Component Interconnect (PCI) bus, an Institute of Electrical and Electronics Engineers (IEEE) 1394 bus, or a PCI Express (PCIe) bus.

The IO control A unit 109, an image processing unit 111, a reading unit 112, and a printer unit 113 are connected to the image bus 110. The image bus 110 connects the image processing unit 111 to the reading unit 112 and the printer unit 113, and is used to perform conversion of image data between a synchronous system and an asynchronous system. The image processing unit 111 performs image processing, such as resolution conversion, compression and decompression, and binary-multivalued conversion, on input and output image data. Furthermore, the image processing unit 111 receives image data from the reading unit 112, and performs control to transfer the received image data to the RAM 104 via the image bus 110 and the system bus 101.

The image processing unit 111 is implemented with image processing application specific integrated circuits (ASIC) (hardware), which performs various image processing operations, and software executed by the CPU 103, which controls the image processing ASIC. The image processing ASIC includes registers for respectively setting the formats of data to be processed and the processing contents. The image processing unit 111 performs image processing while performing settings on the registers of the image processing ASIC based on the control software executed by the CPU 103. The IO control B unit 108, which controls inputting and outputting of image data, is an interface unit associated with the operation unit 114 (user interface (UI)). The IO control B unit 108 outputs, to the operation unit 114, image data to be displayed on the operation unit 114. Furthermore, the IO control B unit 108 transmits, to the CPU 103, information entered by the user of the present system via the operation unit 114.

The operation unit 114 is an interface (U/I) unit equipped with a display device and a keypad device, which are controlled by software. In the present exemplary embodiment, the operation unit 114 is composed of a liquid crystal display (LCD) touch panel and other components, and interprets and displays a Video Graphics Array (VGA) signal output from the IO control B unit 108. The details of the reading unit 112 are described with reference to FIGS. 2 and 3.

Figure 2:
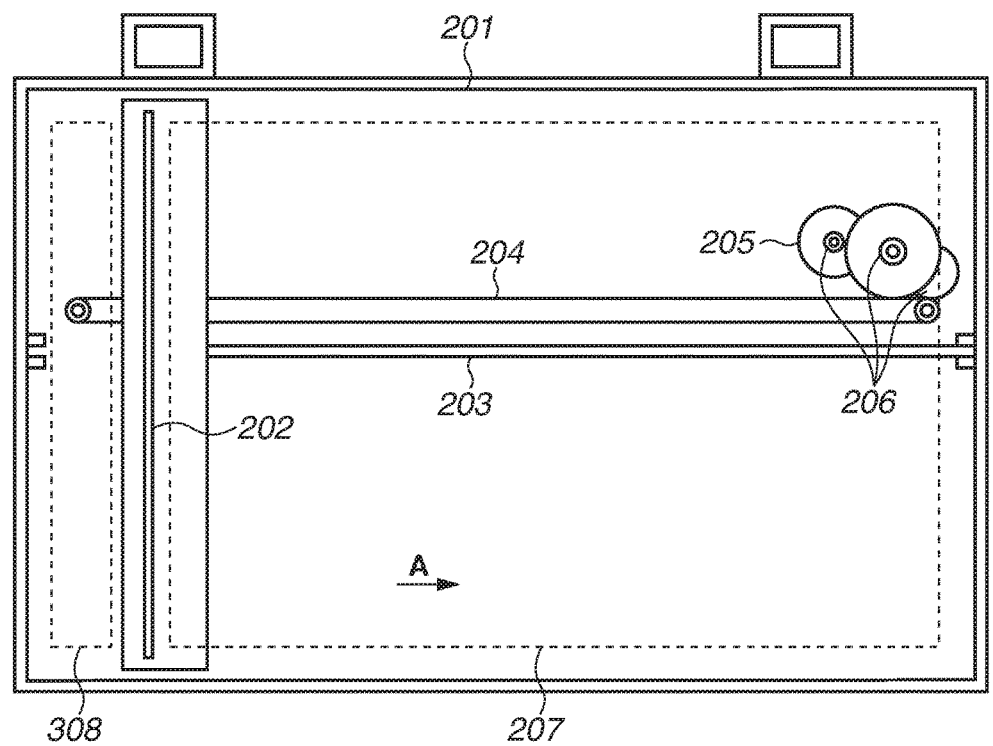
FIG. 2 is a plan view illustrating a configuration of a reading unit.

FIG. 2 is a plan view illustrating a configuration of the reading unit 112 in the image processing apparatus according to the present exemplary embodiment. A scanner unit included in the reading unit 112 is described in detail below with reference to FIG. 2.

Referring to FIG. 2, a reference shaft 203, which serves as a reference axis along which to move a sensor unit 202 in the sub scanning direction (in the direction of arrow A), is mounted at a frame body 201. Then, a drive force from a flat-bed (FB) reading stepping motor 205 (hereinafter referred to as a "stepping motor 205") is transmitted to a belt 204 via a group of gears 206.

The belt 204 is used to move the sensor unit 202 along the reference shaft 203. The frame body 201 is equipped with a document positioning plate glass 207, on which to place a document, and a document-feeding (DF) reading window 308, which is used for DF scan. The DF reading window 308 is made of a material through which light from a light-emitting diode (LED) serving as a light source is allowed to pass, like the document positioning plate glass 207. The sensor unit 202 is capable of being freely moved within an area including the document positioning plate glass 207 and the DF reading window 308. When receiving a scan instruction from the control unit 115, the reading unit 112 drives the stepping motor 105 to drive the belt 204 via the group of gears 206.

According to driving of the belt 204, the sensor unit 202 moves in the sub scanning direction along the reference shaft 203 and reads a document placed on the document position plate glass 207. A document feeder (DF) unit included in the reading unit 112 is described in detail below with reference to FIG. 3.

Figure 3:
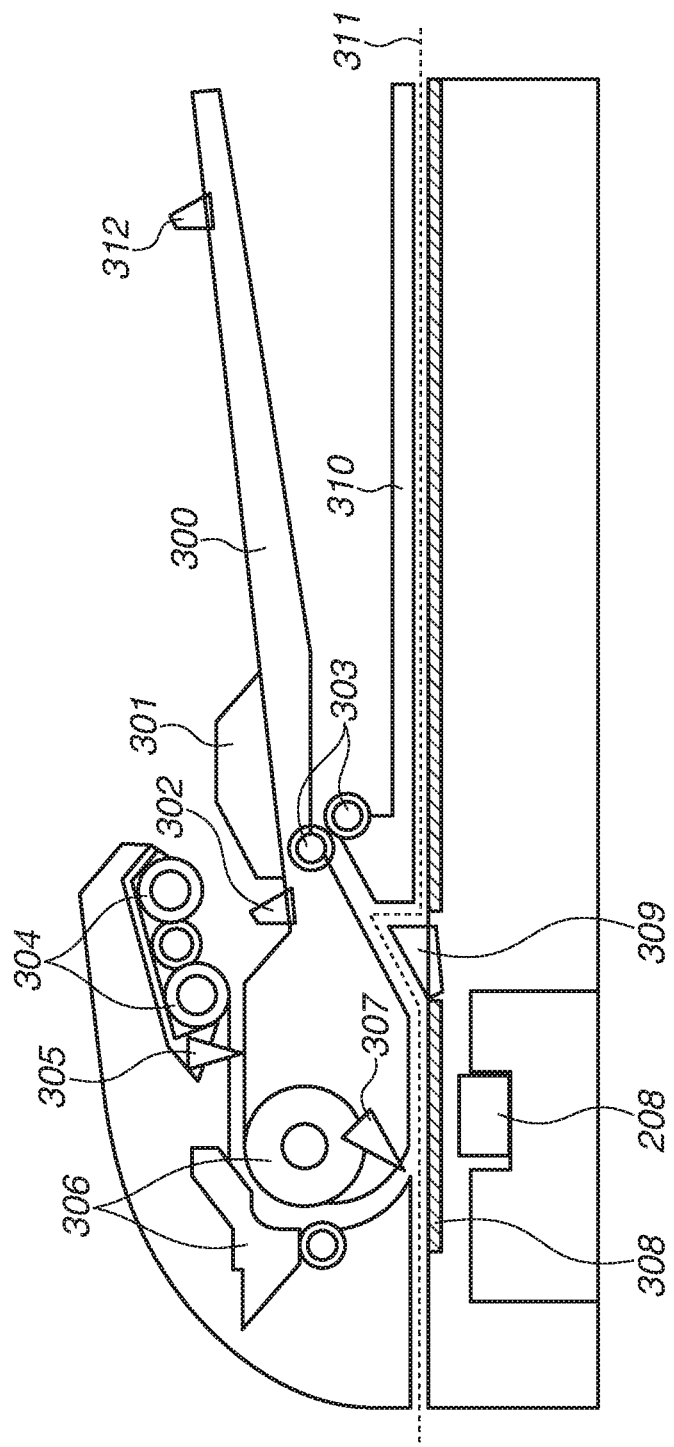
FIG. 3 is a sectional view illustrating a configuration of a document feeder (DF) unit.

FIG. 3 is a sectional view illustrating a configuration of the DF unit, which is connected to the scanner unit illustrated in FIG. 2.

Referring to FIG. 3, the DF unit is equipped with a document tray 300, on which to stack a document that is to be read. On the document tray 300, there are provided a document sensor 302, which is used to detect the presence or absence of a document, two document guides 301, and a document size detection sensor 312.

The document guides 301 are arranged in pair side by side in the document longitudinal direction (in a direction perpendicular to the document conveyance direction). The document stacked on the document tray 300 is conveyed by three roller groups, including pickup rollers 304, conveyance rollers 306, and discharge rollers 303. The pickup rollers 304 are used to convey the document stacked on the document tray 300 into a document conveyance path inside the DF unit.

The conveyance rollers 306 are used to convey the document conveyed by the pickup rollers 304 into the document conveyance path, and the discharge rollers 303 are used to convey the document conveyed by the conveyance rollers 306 up to a discharge tray 310. Furthermore, the document conveyed by the pickup rollers 304 is detected by a document passage detection sensor 305, so that it is determined whether the first sheet of the document has completely passed, based on the time of detection of the document.

Moreover, although not illustrated in FIG. 3, the pickup rollers 304, the conveyance rollers 306, and the discharge rollers 303 are driven by the respective stepping motors. Sub scanning thinning-out processing in the DF unit is implemented by doubling the frequencies of drive pulses for the pickup rollers 304, the conveyance rollers 306, and the discharge rollers 303, similar to a case where sub scanning thinning-out processing in the scanner unit is implemented by doubling the frequency to be input to the stepping motor 205. The document conveyed by the DF unit is read, via the DF reading window 308, by a contact image sensor (CIS) 208, which is mounted in the sensor unit 302 located below the DF reading window 308. The sensor unit 202, which includes the CIS 208, is capable of being freely moved in the sub scanning direction, as mentioned in the foregoing, and is also capable of being moved in the same direction as the conveyance direction of the document conveyed from the conveyance rollers 306 to the discharge rollers 303.

In addition, the DF reading window 308 has a certain degree of length in the sub scanning direction. The CIS 208 is movable to an arbitrary position within a range of such length of the DF reading window 308, thus enabling reading of the document at the position of the CIS 208 as moved. The CIS 208 is composed of an aggregation of photoelectric conversion elements, such as charge-coupled device (CCD) sensors, and simultaneously performs first in, first out (FIFO) for accumulating an image for each photoelectric conversion element and generation of control signals for controlling FIFO and the photoelectric conversion elements. The CIS 208 is generally implemented by arranging a plurality of photoelectric conversion elements in a line. A method for transferring read data to the control unit 115 and a method for detecting a data transfer error during reading are described in detail with reference to FIGS. 4A and 4B and FIGS. 5A and 5B.

FIG. 4A is a timing chart of reading signals that are output from the CIS 208 illustrated in FIG. 3.

While the present exemplary embodiment is described assuming that the CIS 208 is composed of six photoelectric conversion elements, this is only for ease of description. The number of photoelectric conversion elements is not limited to six. Furthermore, in the present exemplary embodiment, a method for detecting any abnormality of a horizontal synchronization (HSync) signal based on the number of pixels of one line and a synchronization signal for one line is described. However, this does not imply that the present invention is limited to processing associated with the detection of abnormality of an HSync signal 402(A). Similar processing is applicable to all of clock signals associated with data transfer, such as a vertical synchronization (VSync) signal 401(A) and a sampling clock (SClk) signal 403(A).

Furthermore, there are known various methods for detecting signal abnormality, all of which can be applied as an error detection method in the present exemplary embodiment. At the time of image reading, the control unit 115 causes the control software, which is executed by the CPU 103, to set the number of pixels and the number of lines of an image to be read by the photoelectric conversion elements to the registers of the image processing ASIC constituting the image processing unit 111. In the present exemplary embodiment, since the photoelectric conversion elements are assumed to be composed of six pixels, reading is performed with six pixels. However, this does not imply that the number of pixels to be read is limited to six. Configuration examples of the registers included in the image processing ASIC are described with reference to FIGS. 5A and 5B.

Figure 5A:
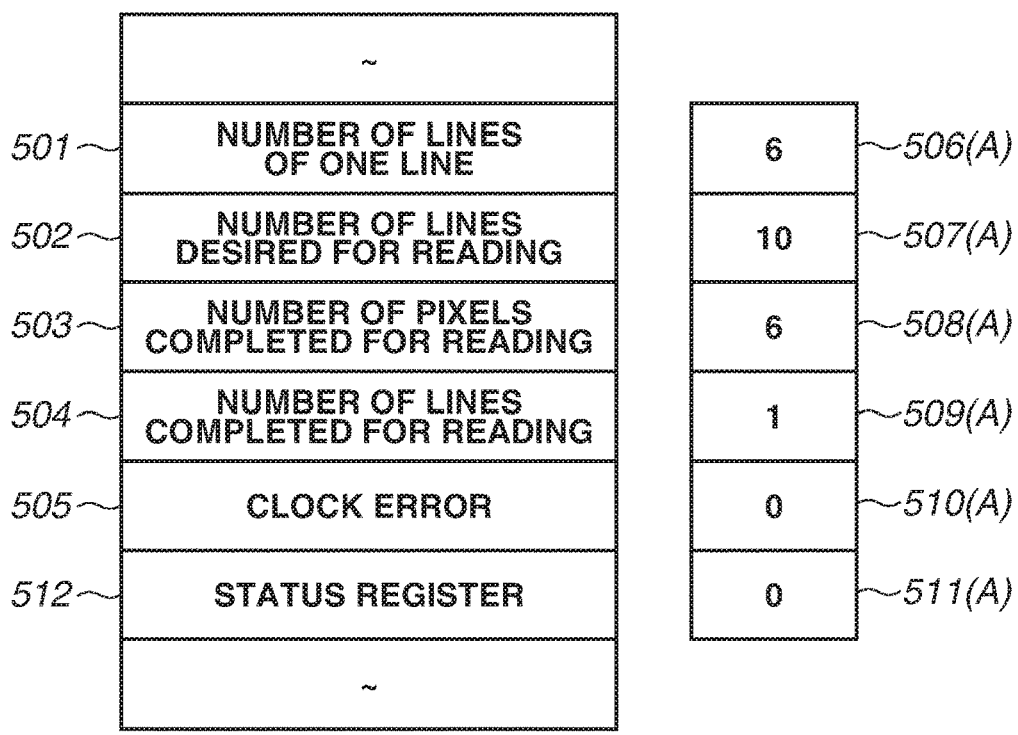
FIGS. 5A and 5B illustrate examples of a configuration of a register.
Figure 5B:
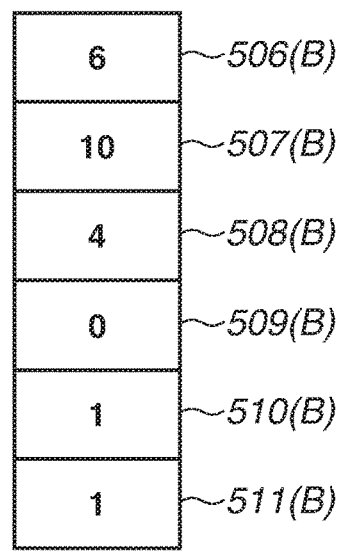

FIGS. 5A and 5B illustrate configuration examples of the registers included in the image processing ASIC.

Referring to FIGS. 5A and 5B, at the time of start of image reading, the control unit 115 sets "6", which is the number of pixels to be read, to a one-line number-of-pixels register 501. The control unit 115 also sets "5", which is the number of lines desired to be read, to a reading desired number-of-lines register 502. After completion of setting to the registers, the control unit 115 issues, to the reading unit 112, an image reading instruction together with information about the number of pixels to be read and the number of lines.

While, in the present exemplary embodiment, the number of pixels to be read is assumed to be "6" and the number of lines desired to be read is assumed to be "5", this does not imply that the number of pixels to be read and the number of lines are restricted. The number of pixels to be read and the number of lines are not restricted as long as they does not exceed the capacity and number of photoelectric conversion elements and FIFO memories constituting the CIS 208.

The reading unit 112, having received the image reading instruction from the control unit 115, issues a VSync signal 401(A) or 401(B), which indicates the start of read data, and outputs data from the photoelectric conversion elements 0 to 5 of the CIS 208 to the FIFO memories included in the CIS 208. The image processing ASIC of the image processing unit 111, having received the VSync signal 401(A), initializes the value of a number-of-read-completed-lines register 504 to "0". Furthermore, the image processing ASIC of the image processing unit 111 also initializes a clock error register 505 and a status register 512, which are used to detect whether an error has occurred at the time of image reading, to "0".

The CIS 208 outputs an HSync signal 402(A), which indicates the head of a line, to issue an instruction to start transfer of data for one line. Furthermore, the CIS 208 outputs, onto the image bus 110, the data from the photoelectric conversion elements stored in the FIFO memories included in the CIS 208. The image processing ASIC of the image processing unit 111, having received the HSync signal 402(A), initializes a number-of-read-completed-pixels register 503 to "0". The initialization of the number-of-read-completed-pixels register 503 is performed every time the HSync signal 402(A) is received, so that the number of read-completed pixels is reset for every line.

After outputting the data from the FIFO memories onto the image bus 110, the CIS 208 outputs an SClk signal 403(A) to notify the image processing unit 111 that a signal for one pixel has been output onto the image bus 110. The image processing ASIC of the image processing unit 111, having received the SClk signal 403(A) acquires data for one pixel from the image bus 110, and transfers the acquired data for one pixel to the RAM 104. After transferring the data for one pixel to the RAM 104, the image processing ASIC of the image processing unit 111 increments the value of the number-of-read-completed-pixels register 503 by one, thus recording information indicating that reading for one pixel has been completed.

The CIS 208 repeats, a number of times corresponding to the number of pixels designated by the image reading instruction, an operation of reading out data about each photoelectric conversion element from the corresponding FIFO memory, outputting the read-out data onto the image bus 110, and outputting the SClk signal. The image processing ASIC of the image processing unit 111, having received the SClk signal, also takes in data for one pixel, transfers the taken-in data to the RAM 104, and then increments the number-of-read-completed-pixels register 503.

The image processing ASIC of the image processing unit 111 repeats such an operation until the value of the number-of-read-completed-pixels register 503 and the value of the one-line number-of-pixels register 501 become equal to each other. When the value of the number-of-read-completed-pixels register 503 and the value of the one-line number-of-pixels register 501 have become equal to each other, the image processing ASIC of the image processing unit 111 refrains from transferring data to the RAM 104 even if the SClk signal 403(A) is input. Furthermore, the image processing ASIC of the image processing unit 111 also refrains from incrementing the number-of-read-completed-pixels register 503.

After completing outputting data for a number of pixels designated by the image reading instruction, the CIS 208 rotates the conveyance rollers 306 or the stepping motor 205 to move the CIS 208 itself or the document to a reading position for the next line. After the movement of the CIS 208 or the document, the CIS 208 also stores data about the photoelectric conversion elements 0 to 5 into the FIFO memories. After completion of storing into the FIFO memories, the CIS 208 outputs the HSync signal 402(A), thus informing the image processing unit 111 that the image data has proceeded to the next line. The image processing ASIC of the image processing unit 111, having received the HSync signal from the CIS 208, checks whether the value of the number-of-read-completed-pixels register 503 and the value of the one-line number-of-pixels register 501 are equal to each other.

This processing is referred to as "number-of-read-completed-pixels comparison processing". The number-of-read-completed-pixels comparison processing is performed by hardware constituting the image processing ASIC of the image processing unit 111.

Figure 6:
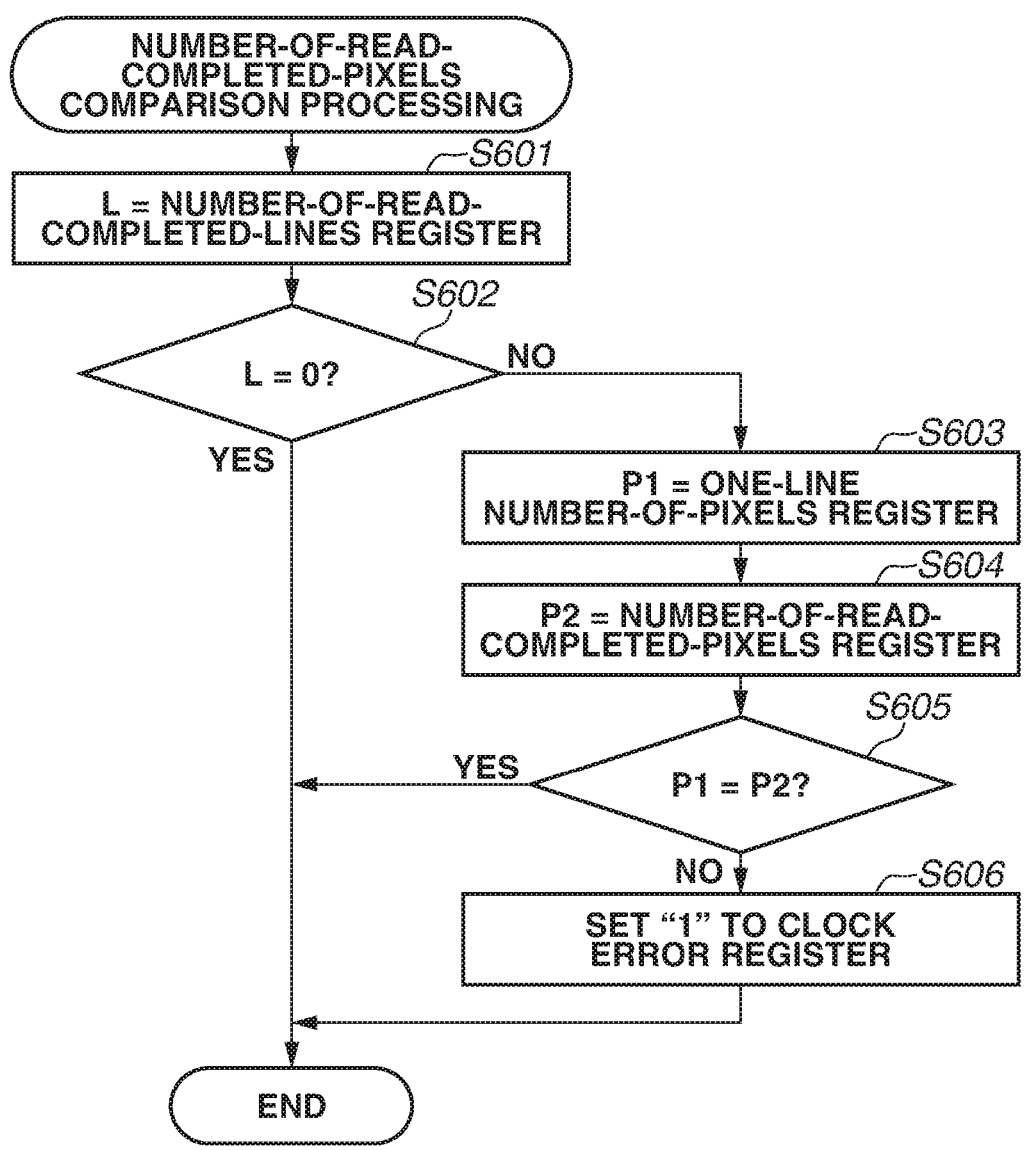
FIG. 6 is a flowchart illustrating a control method for the image processing apparatus.

FIG. 6 is a flowchart illustrating a control method for the image processing apparatus according to the present exemplary embodiment. The control method illustrated in FIG. 6 is an example of the number-of-read-completed-pixels comparison processing. First, in step S601, the image processing ASIC of the image processing unit 111 reads out and sets the value recorded in the number-of-read-completed-lines register 504 to a variable L. After completion of read-out, in step S602, the image processing ASIC of the image processing unit 111 makes a comparison to check whether the variable L of the number-of-read-completed-lines register 504 is "0". This comparison is made to prevent such a situation that, in a case where the HSync signal 402 is input immediately after the VSync signal 401, since the number-of-read-completed-pixels register 503 and the number-of-read-completed-lines register 504 are initialized, it is necessarily determined that a clock error has occurred. If the variable L of the number-of-read-completed-lines register 504 is "0" (YES in step S602), the number-of-read-completed-pixels comparison processing ends. If the HSync signal for the second line or subsequent line (L≥1) is input (NO in step S602), the processing proceeds to step S603.

In step S603, the image processing ASIC of the image processing unit 111 reads out and sets the value of the one-line number-of-pixels register 501 to a variable P1. In step S604, the image processing ASIC of the image processing unit 111 reads out and sets the value of the number-of-read-completed-pixels register 503 to a variable P2. In step S605, the image processing ASIC of the image processing unit 111 makes a comparison between the value of the variable P1 and the value of the variable P2. If the value of the variable P1 is not equal to the value of the variable P2 (NO in step S605), then in step S606, the image processing ASIC of the image processing unit 111 sets "1" to the clock error register 505. If the value of the variable P1 is equal to the value of the variable P2 (YES in step S605), the image processing ASIC of the image processing unit 111 directly terminates the number-of-read-completed-pixels comparison processing without rewriting the value of the clock error register 505.

[Read Processing at the Time of Normal Operation]

The value of the clock error register 505 is initialized to "0" in response to the VSync signal 401 being input, and is set to "1" only when the value of the variable P1 is not equal to the value of the variable P2 due to the HSync signal 402 being input. If the value of the variable P1 is equal to the value of the variable P2 at the time of input of each HSync signal, the value of the clock error register 505 is not updated.

Accordingly, even if the HSync signals 402 for the desired number of lines for reading are input, unless the VSync signal 401 for the next reading is input, the value of the clock error register 505 is kept unchanged. If, as a result of the number-of-read-completed-pixels comparison processing, the value of the number-of-read-completed-pixels register 503 is equal to the value of the one-line number-of-pixels register 501, the image processing ASIC of the image processing unit 111 increments the value of the number-of-read-completed-lines register 504. The correct values 506(A) to 511(A) of the respective registers 501, 502, 503, 504, 505, and 512 set after the completion of reading for one line become as illustrated in FIG. 5A. The same processing is repeated a number of times corresponding to the desired number of lines for reading.

[Read Processing at the Time of Abnormal Operation]

FIG. 4B is a timing chart of reading signals in a case where an abnormal HSync signal 404 is input due to the influence of, for example, noise before the SClk signals for a number of pixels desired for reading are completely input to the image processing ASIC of the image processing unit 111.

After the first HSync signal 405 is input, image transfer is performed according to the SClk signal 403(B). When the abnormal HSync signal 404 has been input, the value 508(B) (FIG. 5B) of the number-of-read-completed-pixels register 503 becomes "4".

Accordingly, as a result of the number-of-read-completed-pixels comparison processing, in which the value 508(B), "4", of the number-of-read-completed-pixels register 503 when the abnormal HSync signal 404 has been input is compared with the value 506(B), "6", of the one-line number-of-pixels register 501, "1" is set to the value 510(B) of the clock error register 505, as illustrated in FIG. 5B. Furthermore, in a case where, when the HSync signal has been input, the value of the number-of-read-completed-lines register 504 has become equal to the value of the reading desired number-of-lines register 502, since it is determined that reading has been normally completed, "0" is set to the value 511(A) of the status register 512, as illustrated in FIG. 5A. Moreover, in a case where a clock error has occurred, "1" is set to the value 511(B) of the status register 512, as illustrated in FIG. 5B, so that an error notification is issued.

The above-described processing enables implementing the detection of a signal abnormality occurring at the time of reading. In the present exemplary embodiment, an example has been described in which a signal abnormality is detected using an incremental system in which the value of the number-of-read-completed-pixels register 503 and the value of the number-of-read-completed-lines register 504 are incremented from the time of start of reading.

However, a signal abnormality may be detected using a decremental system in which the value of the one-line number-of-pixels register 501 is latched to the number-of-read-completed-pixels register 503 at the time of input of the HSync signal, the value of the number-of-read-completed-pixels register 503 is decremented each time the SClk signal is input, and a comparison is made to determine whether the value of the number-of-read-completed-pixels register 503 has become "0" when the next HSync signal is input.

The details of read processing performed when a read error has occurred are described below with reference to FIGS. 7 and 8.

Figure 7:
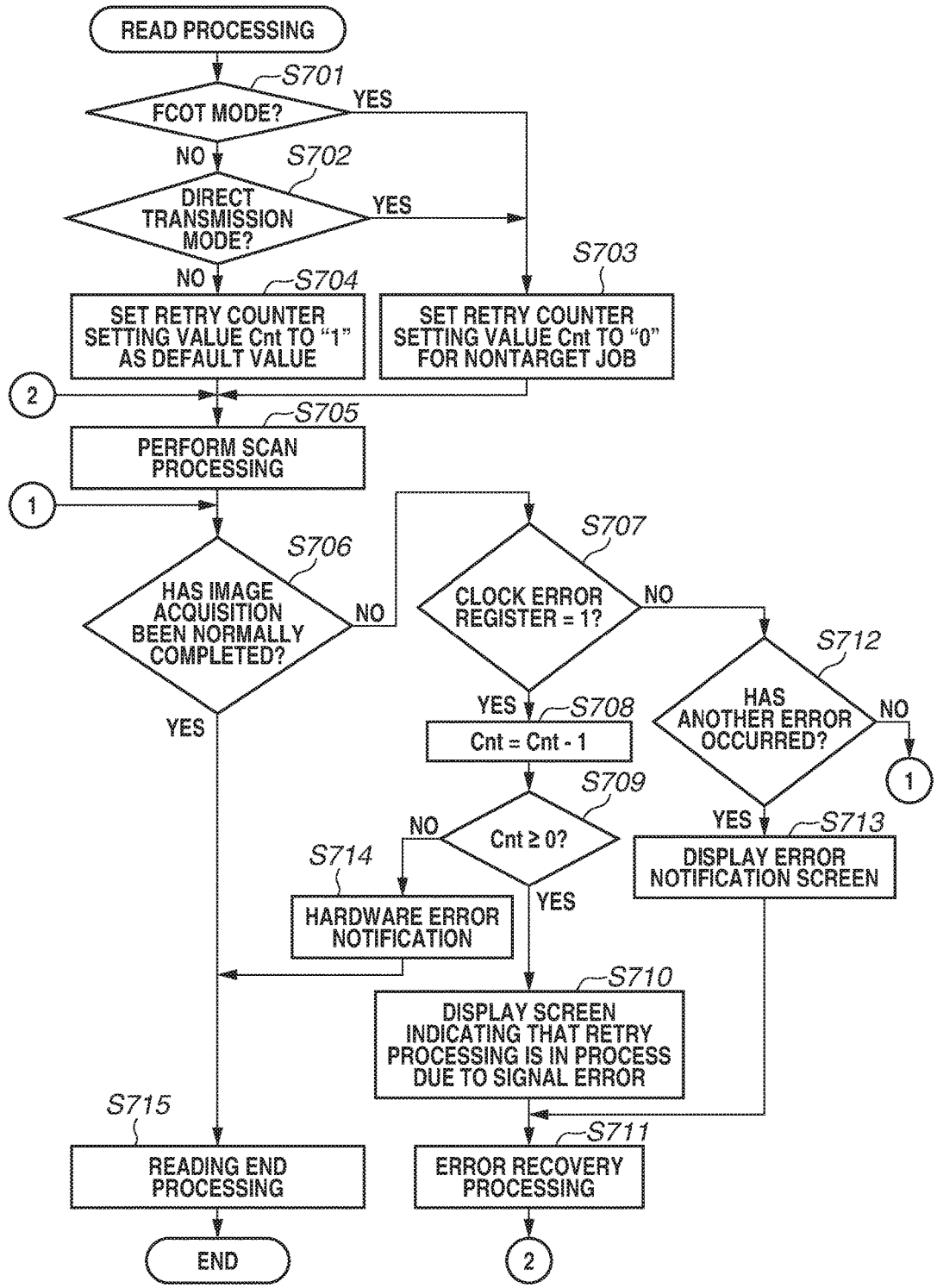
FIG. 7 is a flowchart illustrating a control method for the image processing apparatus.

FIG. 7 is a flowchart illustrating a control method for the image processing apparatus according to the present exemplary embodiment. The control method illustrated in FIG. 7 is an example of the read processing performed when a read error has occurred. Each step is performed by the CPU 103 executing a control application stored in the ROM 102. Furthermore, in the present exemplary embodiment, an example is described in which First Copy Out Time (FCOT) mode or direct transmission mode is used as a mode corresponding to a first condition, and other modes are used as a mode corresponding to a second condition. Here, the mode corresponding to the second condition is, for example, a mechanical error, such as a jam of fed sheets.

Moreover, in the present exemplary embodiment, an example is described in which a job type used at the time of reading is read processing in the direct transmission mode. This does not imply that the present exemplary embodiment is limited to read processing in the direct transmission mode. Since the present exemplary embodiment is directed to an operation of referring to job information generated on the RAM 104 due to the execution of a particular job and switching error processing at the time of reading, the present exemplary embodiment can be applied to all of the reading operations in which read processing and output-side processing are performed in synchronization with each other, such as FCOT mode and other similar modes.

Figure 8:
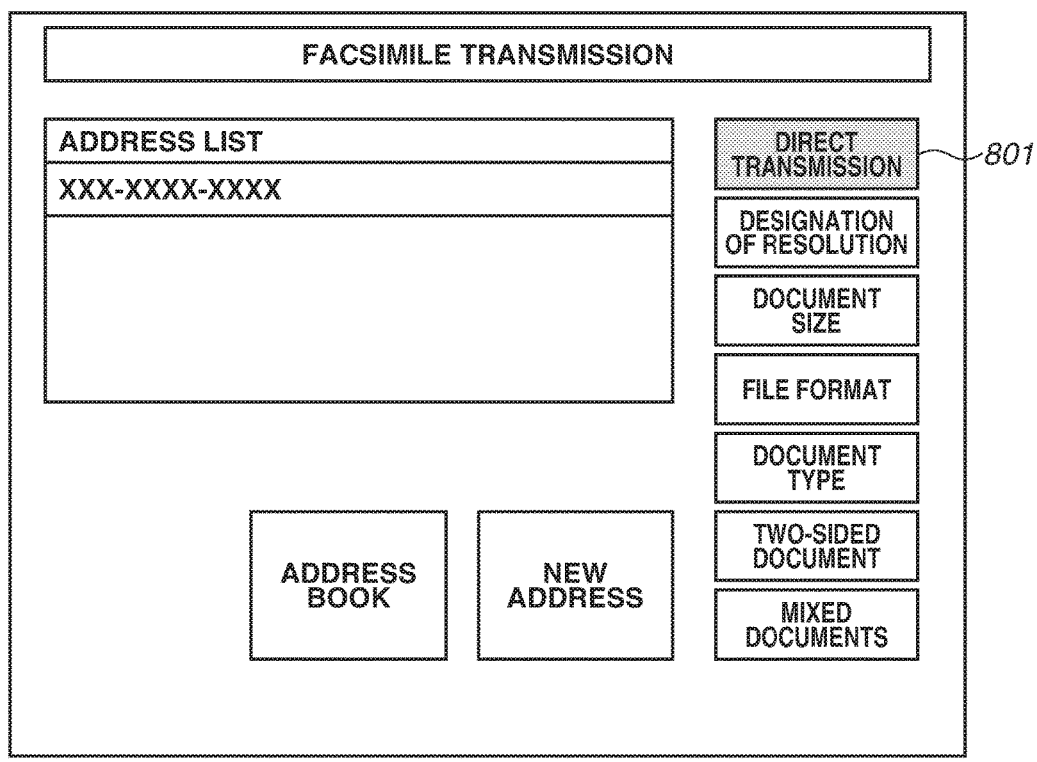
FIG. 8 illustrates an example of a user interface (UI) screen displayed on an operation unit.

FIG. 8 illustrates an example of a user interface (UI) screen displayed on the operation unit 114 illustrated in FIG. 1. The UI screen illustrated in FIG. 8 corresponds to an operation screen for facsimile transmission.

In the following description, unless otherwise stated, all of the flowcharts, control operations, screen display, and other operations, which are to be executed in the present exemplary embodiment, are stored in the ROM 102 or the storage memory 105 included in the control unit 115, and are performed by the control application executed by the CPU 103.

To perform copying or facsimile transmission, the user operates the operation unit 114 to perform settings on a copy job or facsimile transmission job. When, after performing the settings, the user issues an instruction to start the job, the control application generates job information such as that illustrated in FIG. 9A or 9B.

FIGS. 9A and 9B illustrate examples of job information that is executable by the image processing apparatus according to the present exemplary embodiment. In particular, FIG. 9A illustrates job information generated to perform a copy job, in which the mode is set to "FCOT". In the job information illustrated in FIG. 9A, the control application, when generating the job information, automatically determines whether to cause the image processing apparatus to operate in the FCOT mode, according to the other setting values (for example, the number of copies and the color mode).

Furthermore, FIG. 9B illustrates an example of job information indicating that the direct transmission mode is set.

In the case of facsimile transmission illustrated in FIG. 9B, to execute the facsimile transmission job, the user performs a button press operation on a UI screen, such as that illustrated in FIG. 8, displayed on the operation unit 114, thus issuing an instruction to set the direct transmission mode.

When the user presses a direct transmission mode key 801 illustrated in FIG. 8, an instruction indicating that a job in the direct transmission mode is input is issued, so that the direct transmission mode key 801 is highlighted. When, with the direct transmission mode key 801 highlighted, an instruction to execute transmission is issued by the user via the operation unit 114, the control application, which is executed by the CPU 103, generates job information, such as that illustrated in FIG. 9B, and starts read processing, printing, or facsimile transmission processing. The read processing is performed by the control application executing the flowchart of FIG. 7.

Furthermore, in the following description of read processing, the settings of the number of pixels, the number of lines, and other items associated with the read processing are previously determined by the control application, and various settings required for reading an image are set to the image processing ASIC of the image processing unit 111. Incidentally, since processing for determining a setting value about the size of an image to be read does not have much relationship with the gist of the present application, the description of that processing is omitted.

When the read processing is executed, first, processing for determining the number of times of retry at the time of occurrence of an error is performed.

In steps S701 and S702 illustrated in FIG. 7, the control application, which is executed by the CPU 103, checks whether the mode fields 901(A) and 901(B) in the job information 900(A) and the job information 900(B) indicate "FCOT" and "direct transmission mode", respectively.

The job information 900(A) and the job information 900(B) illustrated in FIGS. 9A and 9B are respectively job information for a copy job and job information for direct transmission, and either job information is generated for the associated job.

For example, when the read processing is performed for a copy job, the job information 900(A) is generated, and when the read processing is performed for the direct transmission mode, the job information 900(B) is generated. In the above-mentioned step S701, first, the control application determines whether the job type field in the job information indicates copy. If it is determined that the job type field indicates copy, the control application refers to the value of the mode field.

If the job type field indicates "copy" and the value of the mode field is "FCOT", the control application determines that the mode in the job information is "FCOT" (YES in step S701). Then, the processing proceeds to step S703. In step S703, the control application sets a retry counter setting value Cnt, which is allocated on the RAM 104, to "0".

Similarly, in step S702, the control application determines whether the direct transmission mode is set. If the control application determines that the job type field indicates "facsimile transmission" and the mode field indicates "direct transmission mode" (YES in step S702), the processing also proceeds to step S703, in which the control application sets the retry counter setting value Cnt to "0". In the other cases (NO in step S701 and NO in step S702), the processing proceeds to step S704, in which the control application sets the retry counter setting value Cnt to "1".

Here, for ease of description, assume that the retry counter setting value Cnt is "1". However, this does not imply that the number of times of retry is limited to one.

Furthermore, the number of times of retry can be dynamically set according to various conditions and is not limiting. For example, image forming apparatuses may be equipped with localized information for every country corresponding to the destination in which each image forming apparatus is used, and the number of times of retry may be changed according to the localized information.

In addition, the user may be allowed to set the maximum number of times of retry via a screen on the operation unit 114, or the setting of the number of times of retry may be dynamically switched according to the condition of voltage variation of a power source.

After setting the number of times of retry to the retry counter setting value Cnt, then in step S705, the control application performs scan processing. To start the scan processing, the control application issues, to the reading unit 112, a reading request including the number of pixels and the number of lines of an image.

In this instance, the control application sets the number of pixels and the number of lines of an image to be read to the one-line number-of-pixels register 501 and the reading desired number-of-lines register 502, respectively, which are registers of the image processing ASIC of the image processing unit 111.

The reading unit 112, having received the reading request, issues appropriate synchronization signals, including the VSync signal 401(A), the HSync signal 402(A), and the SClk signal 403(A), and transfers data acquired from the photoelectric conversion elements to the control unit 115. Then, the processing proceeds to step S706, in which the control application determines whether an image has been normally acquired. This determination is made by checking two condition points about whether a reading completion notification indicating the normal completion has been received from the reading unit 112 and whether the clock error register 505 and the status register 512 of the image processing ASIC of the image processing unit 111 are not set to values other than 0. If the control application determines that either condition point is not met, i.e., a reading abnormality has occurred (NO in step S706), the processing proceeds to step S707.

In step S707, the control application determines whether the value of the clock error register 505 is "1". If the control application determines that the value of the clock error register 505 is "1" (YES in step S707), then in step S708, the control application decrements the retry counter setting value Cnt, which is used to count the number of times of execution of predetermined job processing, by "1".

Then, in step S709, the control application determines whether the retry counter setting value Cnt is "0" or more. If the control application determines that the retry counter setting value Cnt is "0" or more (YES in step S709), then in step S710, the control application displays, on the operation unit 114, a screen indicating that the retry processing is in process due to a signal error, thus informing the user that the retry processing is in process.

After the control application changes a screen displayed on the operation unit 114, the processing automatically proceeds to step S711. In step S711, the control application performs error recovery processing. The error recovery processing includes discarding read image data and clearing the registers 501, 502, 503, 504, 505, and 512 of the image processing ASIC of the image processing unit 111.

Furthermore, in a case where the image processing apparatus is in the direct transmission mode or the FCOT mode, the error recovery processing further includes canceling transmitted image processing and printed image processing at the output side, disconnecting a communication line, and discharging fed print sheets. An example of a UI screen displayed when the retry processing is in process is illustrated in FIG. 10.

Figure 10:
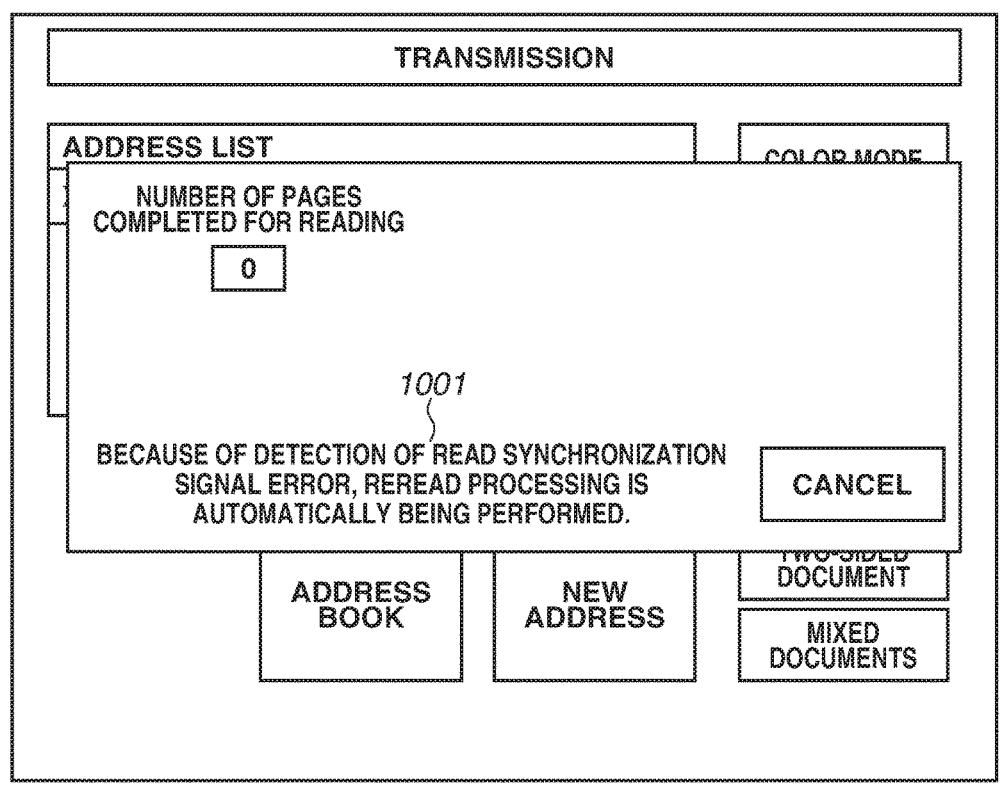
FIG. 10 illustrates an example of a UI screen displayed on the operation unit.

FIG. 10 illustrates an example of a UI screen displayed on the operation unit 114 illustrated in FIG. 1.

Referring to FIG. 10, on a screen displayed during scanning at the normal time, an error processing-in-process notification 1001 is additionally displayed. While, in the present exemplary embodiment, a message indicating that reread processing is automatically being performed as error processing is displayed, the user may be allowed to select whether to perform reread processing at the time of occurrence of an error.

In such an instance, a selection key for selecting whether to perform reread processing is additionally displayed in the screen illustrated in FIG. 10, and, when a reread instruction is issued by the user, the processing proceeds to step S711.

On the other hand, if, in step S707, the control application determines that the value of the clock error register 505 is "0" (NO in step S707), the processing proceeds to step S712. In step S712, the control application determines whether a reading completion notification has been received from the reading unit 112. If the control application determines that the reading completion notification has not been received (NO in step S712), since it is determined that reading is still in process, the processing returns to step S706.

On the other hand, if the control application determines that the reading completion notification has been received (YES in step S712), the control application recognizes error information included in the reading completion notification and detects that another abnormality, such as a document jam, has occurred. Then, the processing proceeds to step S713.

Figure 11:
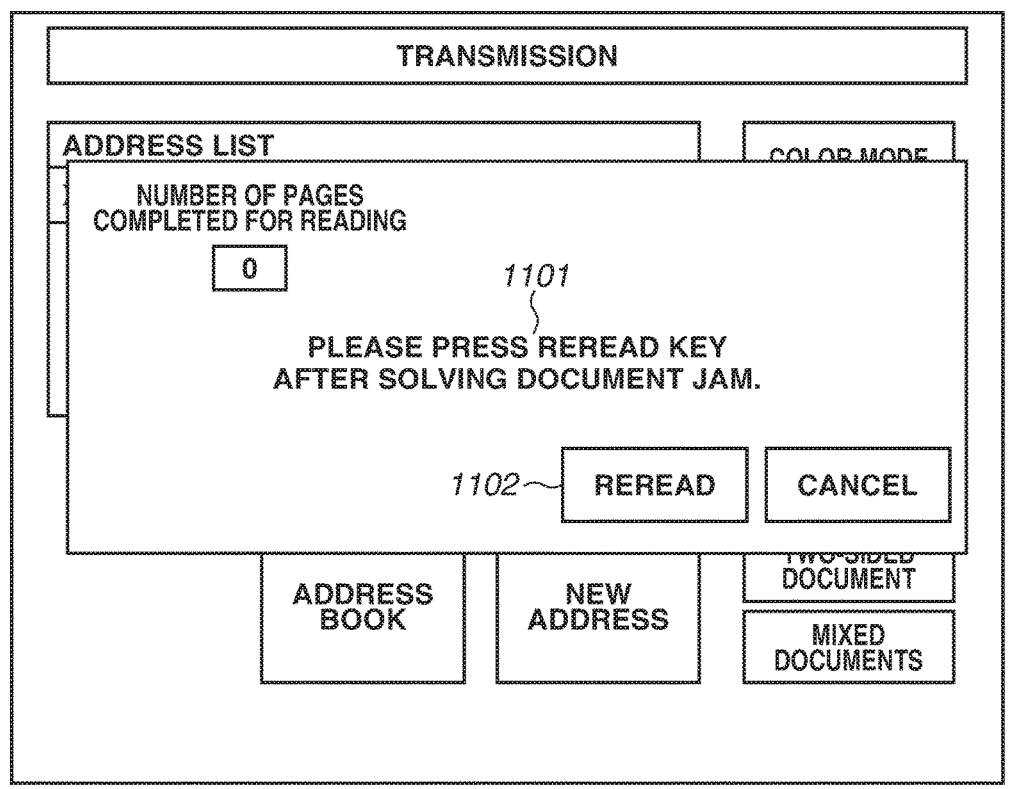
FIG. 11 illustrates an example of a UI screen displayed on the operation unit.

In step S713, the control application displays, on the operation unit 114, an error notification screen for prompting the user to perform some action. For example, according to text 1101 displayed on the screen illustrated in FIG. 11, after solving a document conveyance jam, the user presses a reread instruction key 1102, thus issuing a reread instruction to the image forming apparatus.

Then, in step S711, the control application, having received an instruction from the user via the operation unit 114, performs error recovery processing. The error recovery processing performed after step S713 does not include disconnecting a communication line and discharging fed print sheets.

Figure 12:
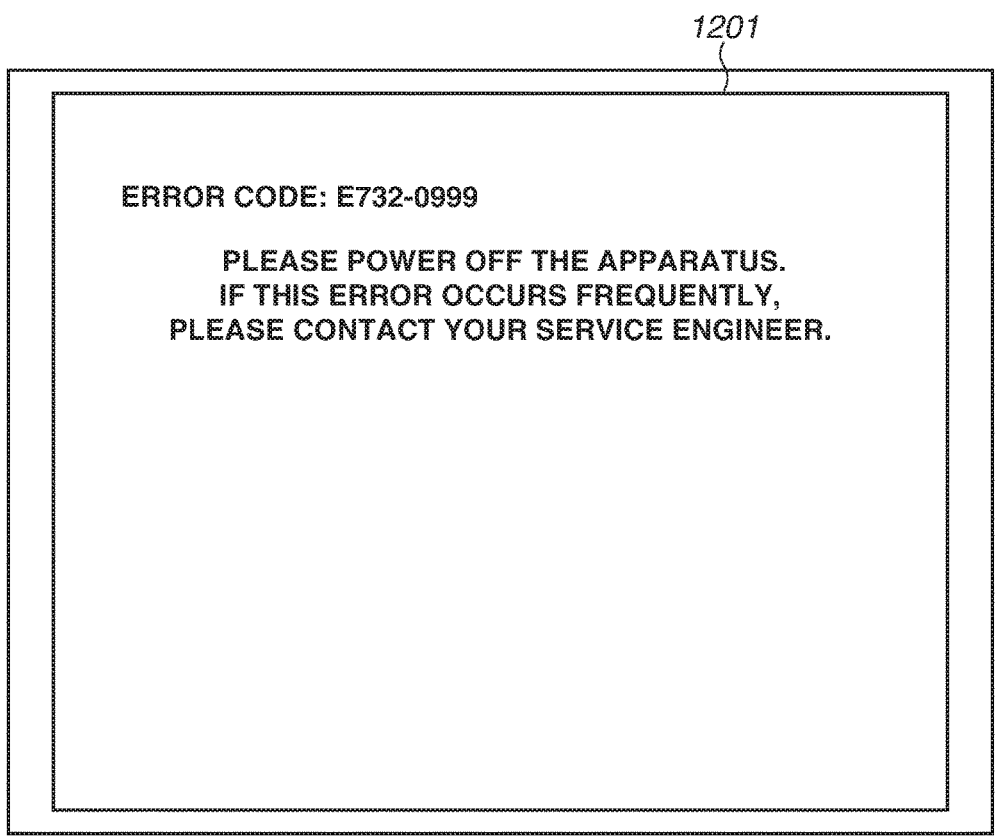
FIG. 12 illustrates an example of a UI screen displayed on the operation unit.

On the other hand, if, in step S709, the control application determines that the image processing apparatus is in a state in which reread processing is to be performed a number of times corresponding to the retry counter setting value Cnt or more (NO in step S709), the processing proceeds to step S714. In step S714, the control application displays, on the operation unit 114, a predetermined error notification, for example, a screen 1201 illustrated in FIG. 12 for indicating a hardware error notification.

Then, when reading is normally completed after rereading, the processing proceeds to step S715. In step S715, the control application performs reading end processing, thus completing reading for one sheet of the document.

With the above-described processing performed, an image processing apparatus can be implemented which is capable of automatically performing reread processing at the time of detection of a signal abnormality without unlimitedly performing recovery processing for reading and without performing wasteful read processing.

Furthermore, in the present exemplary embodiment, an example has been described using a decremental system in which the upper limit value of the number of times of retry is stored in the RAM 104 and the number of times of retry is decremented for every reread processing. However, an image forming apparatus can also be implemented using an incremental system in which another counter is incremented for every read processing and the incremented counter is compared with the number-of-times-of-retry upper setting value Cnt stored in the RAM 104.

In the above-described first exemplary embodiment, there has been described an example of recovery processing for solving an abnormality of signal processing indicated in step S701 or S702 as a first condition. On the other hand, according to a second exemplary embodiment, a threshold value to be set to the number-of-times-of-retry setting value Cnt can be made variable according to information about countries in which image forming apparatuses are used.

This enables an image forming apparatus to perform retry processing adapted to the image forming apparatus in further consideration of an electric power condition or other conditions of a destination in which the image forming apparatus is used.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-262922 filed Dec. 25, 2014, which is hereby incorporated by reference herein in its entirety.

What is claimed is:

1. An image processing apparatus comprising:
    a scanner configured to scan a document image;
    a printer configured to perform printing based on the document image scanned by the scanner; and
    a controller configured to detect an error in process of scanning by the scanner,
    wherein the controller causes, in a case where the image processing apparatus operates in a mode in which the printer starts printing after the scanner completes scanning the document image and the controller detects the error, the scanner to perform rescan processing for rescanning the document image, and
    wherein, in a case where the image processing apparatus operates in a mode in which the printer starts printing before the scanner completes scanning the document image and the controller detects the error, the controller does not cause the scanner to perform the rescan processing.

2. The image processing apparatus according to claim 1, wherein the controller detects the error based on a number of pixels of one line scanned by the scanner not corresponding to a predetermined number of pixels.

3. The image processing apparatus according to claim 1, further comprising a memory configured to store a number of times to perform the rescan processing,
    wherein the controller causes the scanner to perform the rescan processing based on the number of times stored in the memory.

4. The image processing apparatus according to claim 3, wherein the controller issues an error notification based on the controller detecting the error in the process of scanning by the scanner after the rescan processing is performed the number of times stored in the memory.

5. The image processing apparatus according to claim 1, wherein, in a case where the printer starts printing after the scanner completes scanning the document image and the controller detects the error, the controller discards the document image scanned by the scanner and causes the scanner to perform the rescan processing for rescanning the document image.

6. The image processing apparatus according to claim 1, further comprising a display configured to provide a display indicating that the rescan processing is being performed during a period for which the scanner performs the rescan processing for rescanning the document image.

7. A control method for an image processing apparatus including a scanner configured to scan a document image and a printer configured to perform printing based on the document image scanned by the scanner, the control method comprising:

detecting an error in process of scanning by the scanner; and causing, in a case where the image processing apparatus operates in a mode in which the printer starts printing after the scanner completes scanning the document image and the error is detected, the scanner to perform rescan processing for rescanning the document image, wherein, in a case where the image processing apparatus operates in a mode in which the printer starts printing before the scanner completes scanning the document image and the error is detected, the rescan processing is not performed.

8. A non-transitory computer-readable storage medium storing computer executable instructions that, when executed by a computer, cause the computer to perform a control method for an image processing apparatus including a scanner configured to scan a document image and a printer configured to perform printing based on the document image scanned by the scanner, the control method comprising:

detecting an error in process of scanning by the scanner; and causing, in a case where the image processing apparatus operates in a mode in which the printer starts printing after the scanner completes scanning the document image and the error is detected, the scanner to perform rescan processing for rescanning the document image, wherein, in a case where the image processing apparatus operates in a mode in which the printer starts printing before the scanner completes scanning the document image and the error is detected, the rescan processing is not performed.

\* \* \* \* \*